(12) United States Patent
Fox

(10) Patent No.: US 10,458,460 B1
(45) Date of Patent: Oct. 29, 2019

(54) SPRING-LOADED SAFETY LATCH RELEASE FOR POWER LINE HOOK

(71) Applicant: Allan A. Fox, Las Vegas, NV (US)

(72) Inventor: Allan A. Fox, Las Vegas, NV (US)

( * ) Notice: Subject to any disclaimer, the term of this patent is extended or adjusted under 35 U.S.C. 154(b) by 0 days.

(21) Appl. No.: 16/109,556

(22) Filed: Aug. 22, 2018

Related U.S. Application Data

(60) Provisional application No. 62/548,853, filed on Aug. 22, 2017.

(51) Int. Cl.
*F16B 45/02* (2006.01)
*A62B 35/00* (2006.01)

(52) U.S. Cl.
CPC ........ *F16B 45/025* (2013.01); *A62B 35/0025* (2013.01)

(58) Field of Classification Search
CPC ......... A62B 1/02; A62B 35/0025; B66C 1/12; B66C 1/125; B66C 1/34; B66C 1/36; B66C 2700/0371; F16B 45/02; F16B 45/04; F16B 45/025
See application file for complete search history.

(56) References Cited

U.S. PATENT DOCUMENTS

| | | | |
|---|---|---|---|
| 1,521,811 A * | 1/1925 | Hartbauer | F16B 45/02 24/600.1 |
| 1,533,995 A * | 4/1925 | Lang | B66C 1/36 24/600.2 |
| 2,246,630 A | 6/1941 | Johnson | |
| 3,918,758 A | 11/1975 | Fournier | |
| 4,114,940 A | 9/1978 | Brynemo et al. | |
| 4,193,627 A | 3/1980 | Cranston et al. | |
| 4,195,872 A | 4/1980 | Skaalen et al. | |
| 5,538,303 A | 7/1996 | Dunham | |
| 5,735,025 A * | 4/1998 | Bailey | F16B 45/02 24/600.1 |
| 7,658,424 B2 | 2/2010 | Sviland | |
| 9,463,960 B2 | 10/2016 | Pantsar et al. | |
| 2005/0242602 A1 | 11/2005 | Protesto | |
| 2017/0073196 A1 | 3/2017 | Choudhari et al. | |

FOREIGN PATENT DOCUMENTS

| | | |
|---|---|---|
| CN | 202201624 | 4/2012 |
| CN | 202214137 | 5/2012 |
| CN | 204022275 | 12/2014 |
| DE | 1937764 | 7/1969 |
| EP | 0059228 | 2/1981 |
| GB | 1430543 | 3/1976 |

OTHER PUBLICATIONS

Universal Hook Latch; retrieved on Apr. 13, 2017 from http://www.caldwellinc.com/rig-master/special-applications/universal-hook-latch; Model H shown Model A-O Universal Hook Latch.

* cited by examiner

*Primary Examiner* — Stephen A Vu
(74) *Attorney, Agent, or Firm* — Kenehan & Lambertsen, Ltd.; John C. Lambertsen

(57) ABSTRACT

A power line hook includes a spring-loaded safety latch with a mechanical release pin attached to the safety latch and extending through the hook body to an engagement catch or ring. The hook shank surface adjacent to the release pin and engagement ring is configured for receipt within a groove formed at an end of a standard hotstick, enabling its swift and secure connection thereto, with a user able to readily manipulate the position of the hook end and safety latch release while using the hot stick.

10 Claims, 6 Drawing Sheets

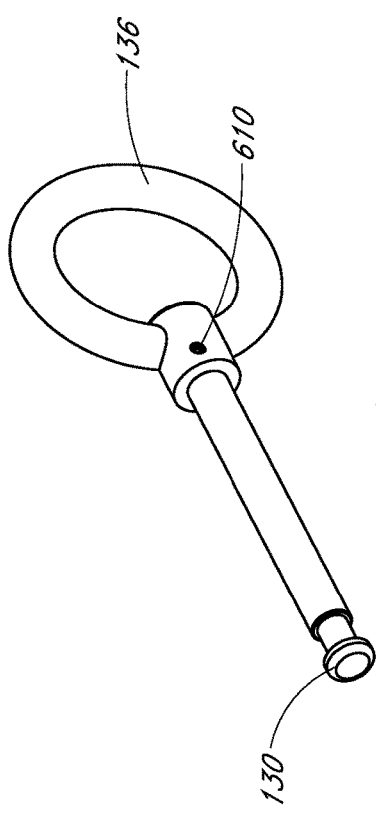
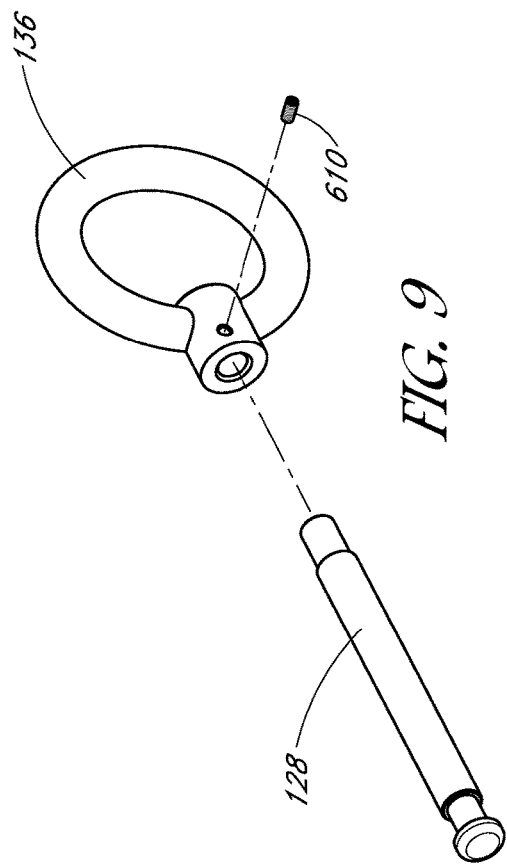
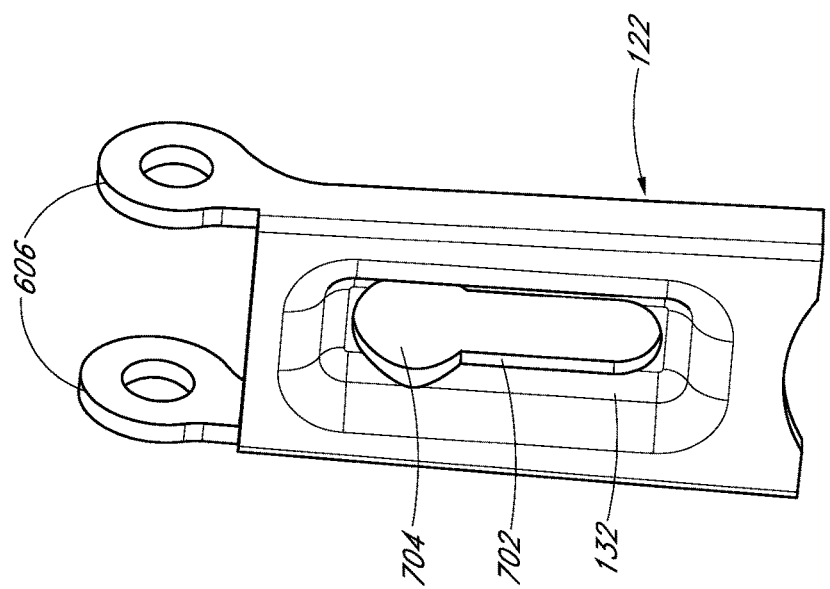

SPRING-LOADED SAFETY LATCH RELEASE FOR POWER LINE HOOK

CROSS-REFERENCE TO RELATED APPLICATIONS

The present application claims the benefit of priority under 35 USC § 119(e) to U.S. Provisional Application No. 62/548,853 filed on Aug. 22, 2017, which is incorporated by reference herein for all that it contains.

BACKGROUND

Field of the Invention

The present invention relates to hooks and, more particularly, to power line hooks used to attach tensioning equipment to support rigging. More specifically, the present invention relates to a power line hook having a mechanical release attached to a spring-loaded safety latch.

Description of the Related Art

Electric utilities must maintain and replace electrical equipment regularly. Where possible, the utilities avoid customer outages or system-loading problems by conducting such work while the lines and equipment remain energized—termed "live-line working."

For protection, workers doing live-line work rely upon a variety of insulating protective equipment. When manipulating tools or line equipment, workers may use insulating gloves or make use of insulating line tools such as hotsticks, specifically switchsticks and shotgun sticks.

Overhead line work frequently requires the use of tensioning equipment, either to prevent lines sagging into energized lines or to remove line tension when working on the energized line. Hooks are often part of the tensioner system, attaching the tensioner to a support rigging structure, such as a cable grip.

Regulations require the hook end to include a safety catch or latch that extends across the hook end mouth or hook throat. The latch prevents the rigging point from inadvertently backing out of the hook end during use of the tensioner. When hook end removal from the rigging point is required, the linemen must first pivot the safety latch from its extended position across the hook end throat. With the latch no longer extending across the opening, the cable grip or other support rigging structure, such as dead-end shoes or slings, may be removed from within the hook end.

For workers using insulated gloves or hotsticks, manipulating safety latches is cumbersome. For many years, the latches were taped open or otherwise disabled. The OSHA policy of looking-the-other-way has changed, bringing increased inspections and higher fines for violations. Increased compliance with safety latch regulations has made live-line work harder for linemen.

BRIEF SUMMARY

The present invention provides a mechanical release attached at one end to a spring-loaded safety latch and extends through the hook end to terminate in an engagement catch or engagement ring. A lineman wearing insulation gloves or using insulating line tools, such as a standard hotstick, may more quickly engage the ring or catch when required to open the safety latch. Pulling on the outer ring or catch opens the safety latch, permitting removal of the rigging from within the hook end. Upon release of the engagement ring or catch, the spring-loaded safety latch closes.

One aspect of the embodiments disclosed herein is a spring-loaded safety latch release for a power line hook comprising, a hook body including a hook shaft extending from a hook base, a hook shank extending in an opposite direction from the hook base, the hook shank extending in a curvilinear manner and terminating in a hook end, the curvilinear hook shank defining a hook opening and the hook end and hook base together defining between them a hook throat that is configured in a manner such that through which a support rigging structure, such as a cable grip, may pass into and out from the hook opening. A safety latch pivotally connected to the hook base and movable toward and away from the hook end for opening and closing access to the hook throat, wherein the safety latch is spring-biased toward the hook end in a manner closing access to the hook throat. A release pin attached at a first end to the safety latch and at a second end to an engagement ring, wherein the hook body has an aperture formed therein, extending within the hook end in a linear manner from an opening formed in an outside surface of the hook shank to an opening formed in an inside surface of the hook base adjacent the hook throat. Wherein the release pin is slidably and rotatably received within the aperture, the first end extending outside the opening in the surface of the hook base and the second end extending outside the opening in the surface of the hook shank; and wherein in its assembled operable condition the safety latch and the release pin jointly and cooperatively move upon the application of force to either of them.

Another aspect in accordance with the embodiments disclosed herein is a spring-loaded safety latch release for a power line hook comprising, a hook body having a curved hook shank defining a hook opening and a hook throat, the hook throat providing access to the hook opening. A safety latch pivotally attached to the hook body and having an extended position across the hook mouth blocking access to the hook opening and a retracted position removed from the hook mouth and unblocking access to the hook opening, wherein the safety latch is spring-biased in the extended position, and wherein the hook body has an aperture formed therein and extending entirely through the hook body from a location accessible to the safety latch and extending to a location on the hook body remote therefrom. A release pin slidably received within the hook body aperture, the release pin extending from the location accessible to the safety latch to the location on the hook body remote therefrom, wherein the release pin has a first and a second end, the first end attached to the safety latch; and an engagement ring attached to the second end of the release pin at a location remote from the location accessible to the safety latch.

These and other objects, aspects, and features of the present invention will be better understood from the following description of embodiments when read in conjunction with the appended drawing figures.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

The preceding aspects and other aspects of this disclosure are described in detail below in connection with the accompanying drawing figures in which:

FIG. 7 illustrates an enlarged perspective view of the safety latch shown in the power line hook of FIG. 1 in accordance with one embodiment;

FIG. 8 illustrates a perspective view of a release pin of the safety latch shown in the power line hook of FIG. 1 showing the release end cap and the engagement ring attached to the release pin in accordance with one embodiment;

FIG. 9 illustrates an exploded perspective view of the release pin and engagement ring of the power line hook of FIG. 1 showing the manner of attachment of the engagement ring to the release pin in accordance with one embodiment.

DETAILED DESCRIPTION

A spring-loaded safety latch for a power line hook is disclosed in the attached drawings and is described below. The embodiments are disclosed for illustration of the spring-loaded safety latch for a power line hook and a manner of making use of such spring-loaded safety latch for a power line hook and are not limiting except as defined in the appended claims.

Figure 1:
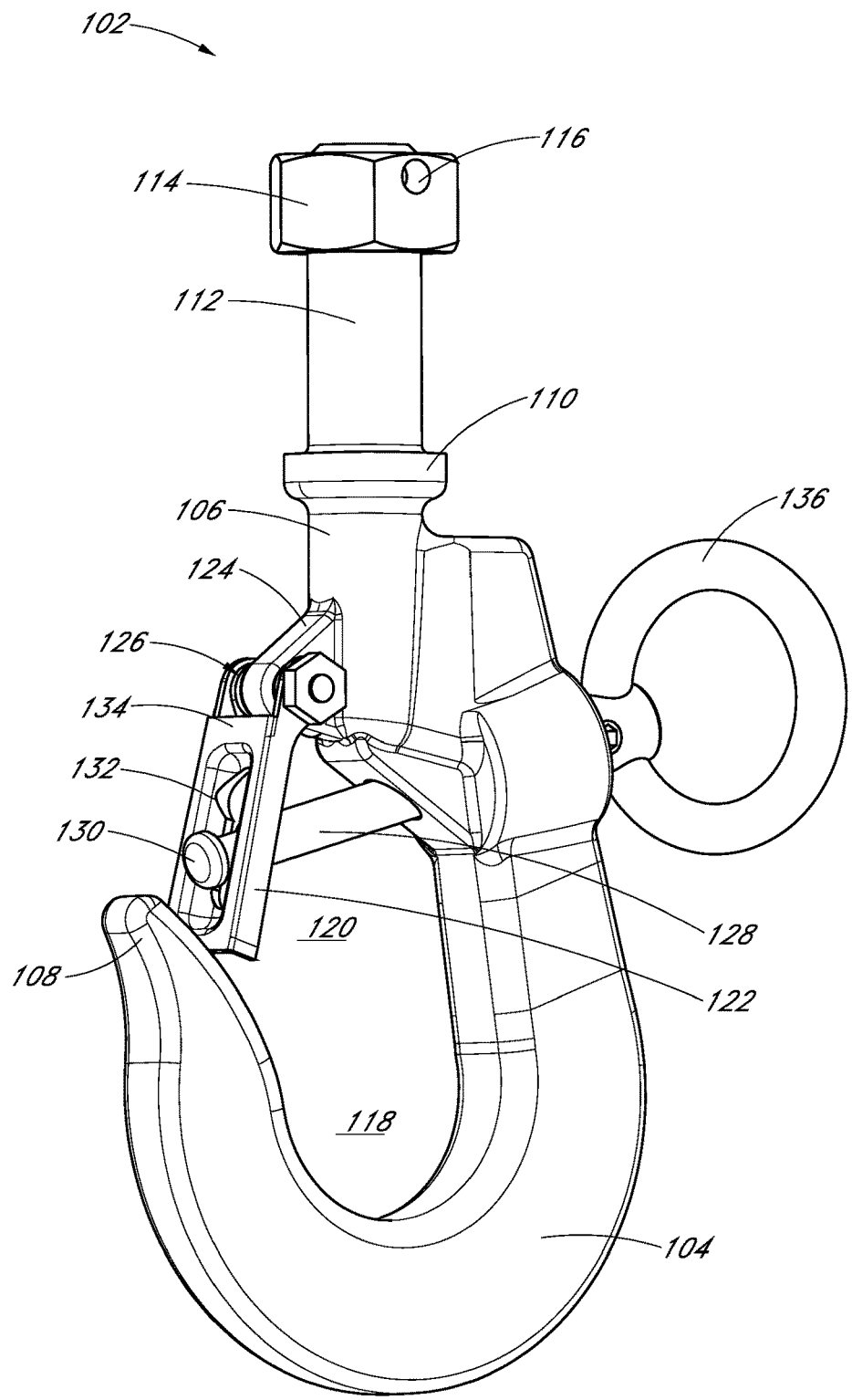
FIG. 1 illustrates a perspective view of the power line hook disclosed herein and in accordance with the present invention.

Reference is now made to the drawings wherein like structures refer to like parts throughout. In FIG. 1 a power line hook 102 includes a hook shank 104 that extends in a curvilinear manner from a hook base 106 to a hook end 108.

A shaft shoulder 110 is formed at the terminus of the hook base, with a hook shaft 112 extending from the shaft shoulder to a threaded terminus. A shaft retention nut 114 is shown received upon the threaded terminus, with the hook shaft, the shaft shoulder, and the shaft retention nut cooperatively receiving the power line hook in a secure manner upon a tensioner system. Additional security may be obtained by securing the shaft retention nut with a roll pin (not shown in FIG. 1), with a roll pin aperture 116 shown formed in the shaft retention nut.

The curvilinear hook shank defines a hook opening 118. A hook throat 120 extends between the hook end and the hook base, and when the power line hook is used with tensioning equipment to attach the tensioner to support rigging structures, the hook throat is configured to enable a cable grip or other support rigging structure to pass into and out from the hook opening.

A safety latch 122 is attached to a safety latch anchor 124 projecting from the hook base using a spring-biased attachment 126. The safety latch pivots about its attachment to the hook base, for opening and closing access to the hook throat. The safety latch is preferably spring-biased toward the hook end, with the safety latch as so biased closing access to the hook throat for cabling lying within the hook opening.

A release pin 128 is attached to the safety latch, preferably using a release pin end cap 130 received within a safety latch recess 132 formed in an outwardly face 134 as shown in FIG. 1. The release pin extends through an aperture formed in the hook body, to its attachment to an engagement catch, preferably as an engagement ring 136.

Figure 3:
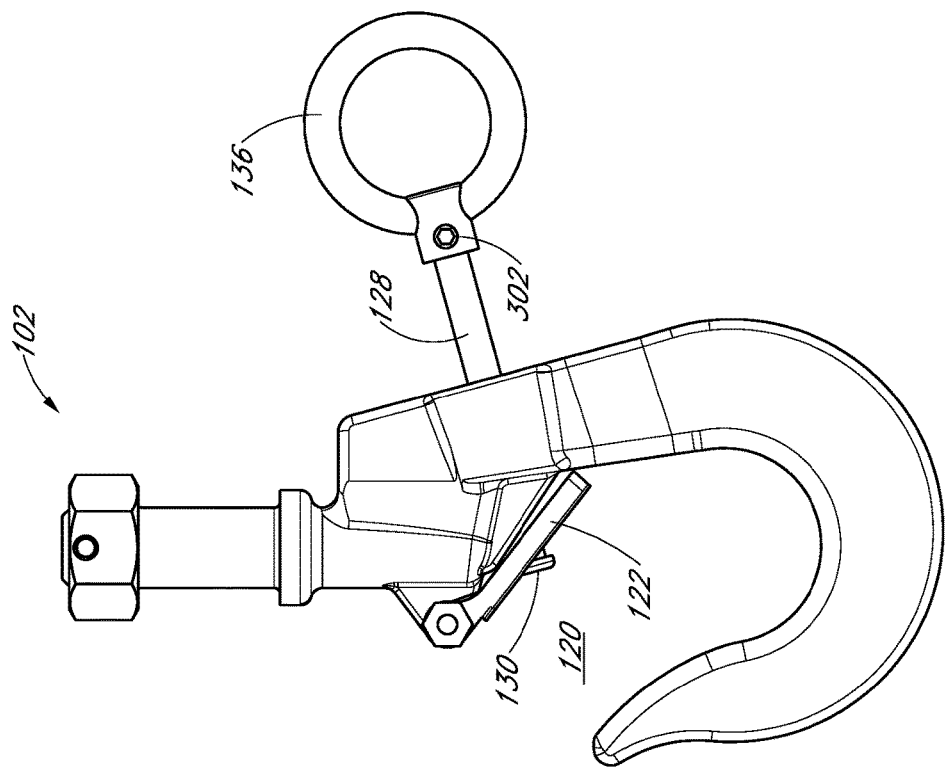
FIG. 3 illustrates a side elevation view of the power line hook of FIG. 1 showing the engagement ring and the release pin positioned in a manner that places the safety latch in the open position in accordance with one embodiment.
Figure 2:
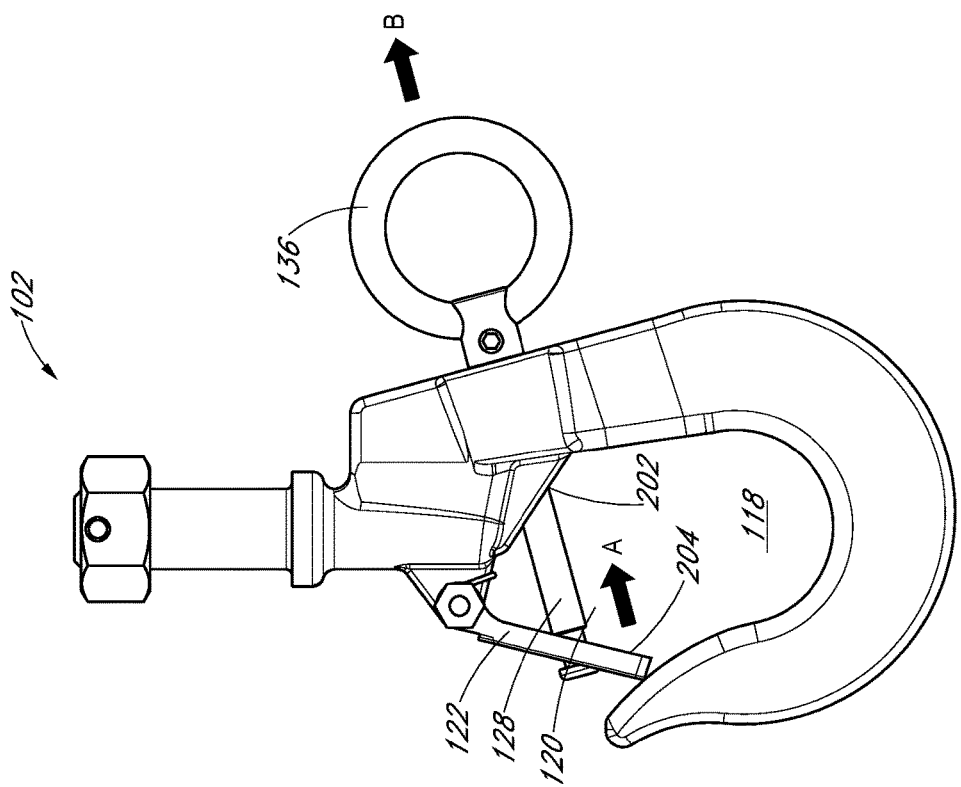
FIG. 2 illustrates a side elevation view of the power line hook of FIG. 1 showing the engagement ring and the release pin positioned in a manner that places the safety latch in the closed position in accordance with one embodiment.

FIGS. 2 and 3 illustrate the hook and safety latch operating in a normal and satisfactory manner to receive a rigging point (not shown in the Figures), with the safety latch pivoting in the direction of Arrow A in response to pressure from a cable grip or other rigging against the safety latch as it enters the hook throat. Once the rigging point is received within the hook opening, the spring-loaded safety latch returns to its extended position, blocking the hook throat to prevent the un-commanded disengagement of the hook and rigging.

Upon work completion, pulling on the engagement ring in the direction of Arrow B results in the movement of the safety latch in the direction of Arrow A, opening/unblocking the hook throat permitting the removal or disengagement of the rigging point from the power line hook. In a presently preferred embodiment an angled, planar latch-receiving surface 202 is formed on an inside surface of the hook base, the latch-receiving surface positioned and configured in a manner to receive an inwardly face 204 of the safety latch upon its pivoting to a fully opened position, as shown in FIG. 3.

FIG. 3 shows the manner of attachment of the engagement ring to the release pin, preferably an attachment collar 302. The release pin freely rotates within the hook body, as well as in its connection with the safety latch. Such free-spinning of the engagement ring assists an operator utilizing a standard hotstick toward swiftly and securely obtaining an operable attachment to the engagement ring.

It is to be understood and appreciated that the attachment of the release pin to both the safety latch and the engagement ring enables the joint and cooperative movement of them both upon the application of force to either of them. Upon release of the engagement ring, ending the pulling force, the spring-loaded safety latch returns to its closed (blocking) position, extending across the hook throat. The safety latch return likewise results in the repositioning of the engagement ring to its initial position adjacent the hook shank.

Use of the mechanical release of the present invention considerably simplifies release of the hook from the rigging. An unmodified safety latch requires a lineman to manipulate the safety latch, using insulating gloves or remotely, using a hotstick. The lineman must first open the latch and continue to hold it open—all within the narrow confines of the hook throat through which the rigging must also pass. The mechanical release of the present invention enables a gloved or remote lineman to engage and quickly open the safety latch.

Figure 4:
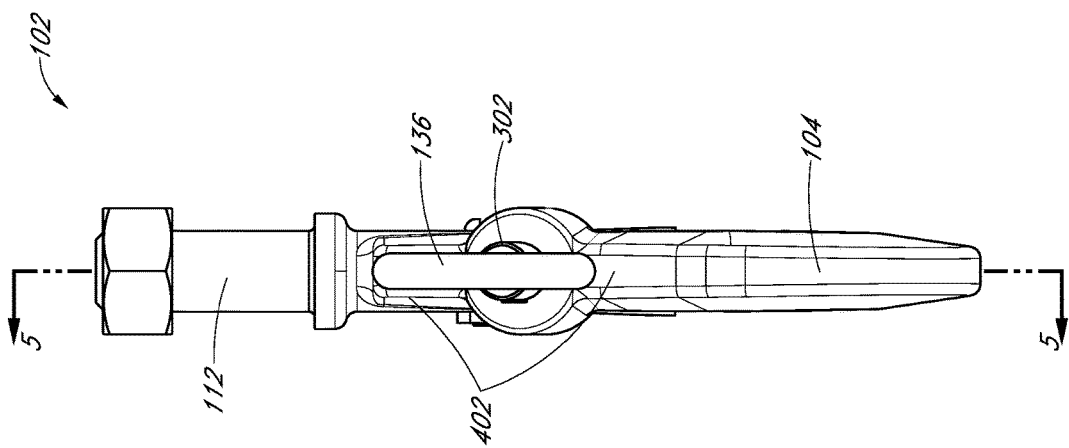
FIG. 4 illustrates an end elevation view showing the engagement ring and the attachment surface of the power line hook of FIG. 1 in accordance with one embodiment.

In FIG. 4 an outside surface of the hook shank adjacent an opening through which the release pin extends forms an attachment surface 402 that is planar and of a certain width, both of which are configured for receipt of the attachment surface within a groove formed at an end of a standard hotstick. As shown in FIG. 4, the engagement ring overlies the attachment surface of the hook shank, and with the free-spinning engagement ring and release pin through the attachment collar 302, the attachment surface and the engagement ring are adapted for a swift and secure connection to a standard hotstick. Additionally, in a presently preferred embodiment, the release pin and its direction of slidable travel are oriented in 90 degree relation to the attachment surface of the hook body.

A handle on the hotstick enables a user to exert a pulling force on the hook, which in turn pulls on the mechanical release to open the safety latch. The hotstick remains attached to the power line hook, and the user can wield the hotstick to position the power line hook as required to release the rigging from within the hook throat.

A hook release trigger on the hotstick enables the user to disengage the hotstick from its temporary engagement with the hook/engagement catch. Upon such disengagement, the spring-loaded safety latch returns to its closed position.

Figure 5:
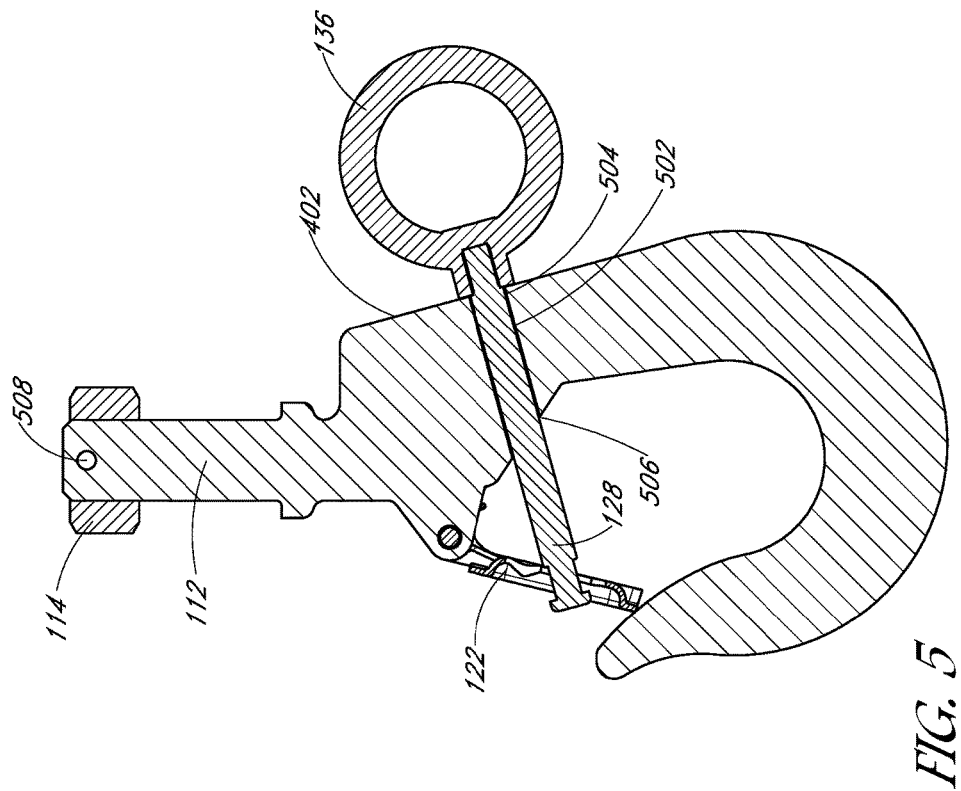
FIG. 5 illustrates a cross-sectional elevation view of the power line sensor of FIG. 1 taken along the line 5-5 in FIG. 4, the view in FIG. 5 showing the release pin received within a hook body aperture in accordance with one embodiment.

In a presently preferred embodiment, and by way of example and not limitation, the body of the power line hook is conventionally fabricated using forged steel. As shown in FIG. 5, a hook body aperture 502 is formed in the hook near the hook base and extends between a first opening 504 formed in an outside surface of the hook shank to a second opening 506 formed in an inside surface of the hook base adjacent the hook throat. FIG. 5 also shows a roll pin indent 508, cooperatively used with the roll pin aperture 116 of FIG. 1 and a roll pin (not shown in the Figures) to secure the shaft retention nut 114 when securing the power line hook to a tensioner device.

Figure 6:
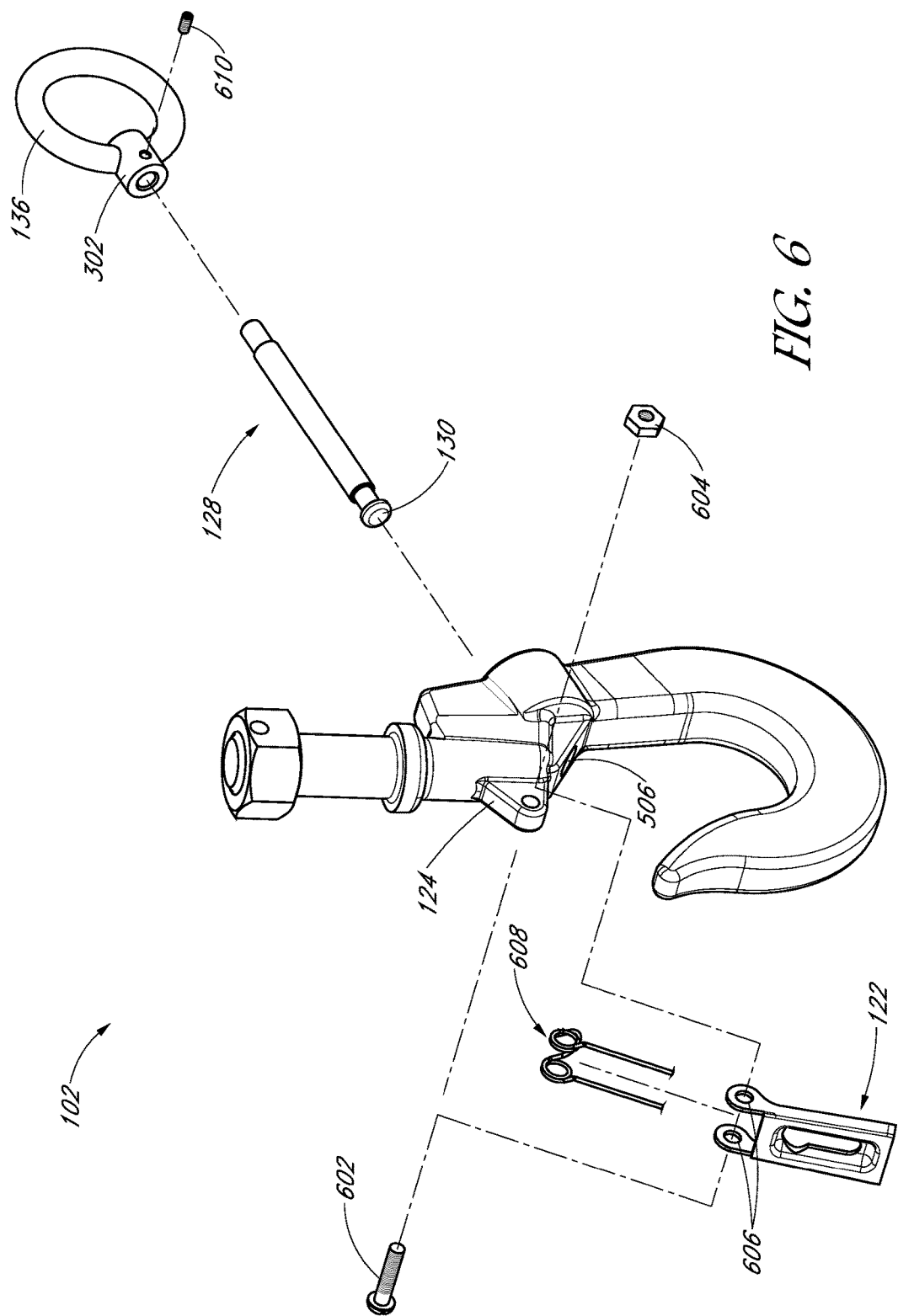
FIG. 6 illustrates an exploded perspective view of the power line hook of FIG. 1 showing the manner of attachment of the safety latch and the releases pin in accordance with one embodiment.

FIG. 6 shows the manner of attaching both the safety latch and the release pin to the hook body. A retaining bolt 602 is received in an aperture formed in the safety latch anchor 124 and is secured by a retaining nut 604. In the process, the retaining bolt captures a pair of attachment prongs 606 that extend from the safety latch as well as a pair of torsion springs 608 that are arranged to bias the safety latch in a closed position.

The release pin 128 extends through the hook body aperture, emerging from the second opening 506 for its attachment to the safety latch 122. The other end of the release pin extends from the hook body and is attached to the attachment collar 302 formed on the engagement ring 136. A set screw 610 is preferably used to secure the attachment collar to the release pin.

FIGS. 7-9 illustrate the manner of attaching the release pin 128 to the safety latch 122. The release pin end cap 130 is captured within an end cap travel 702 formed within the safety latch recess 132. Entry of the end cap into the end cap travel is through an enlarged end cap entry opening 704. The end cap and an adjoining length of the release pin moves within the end cap travel as the safety latch pivots between its open and closed positions. The end cap and the safety latch recess are cooperatively configured to minimize end cap protrusion into the open hook throat when the safety latch is in the fully opened position.

Figure 10:
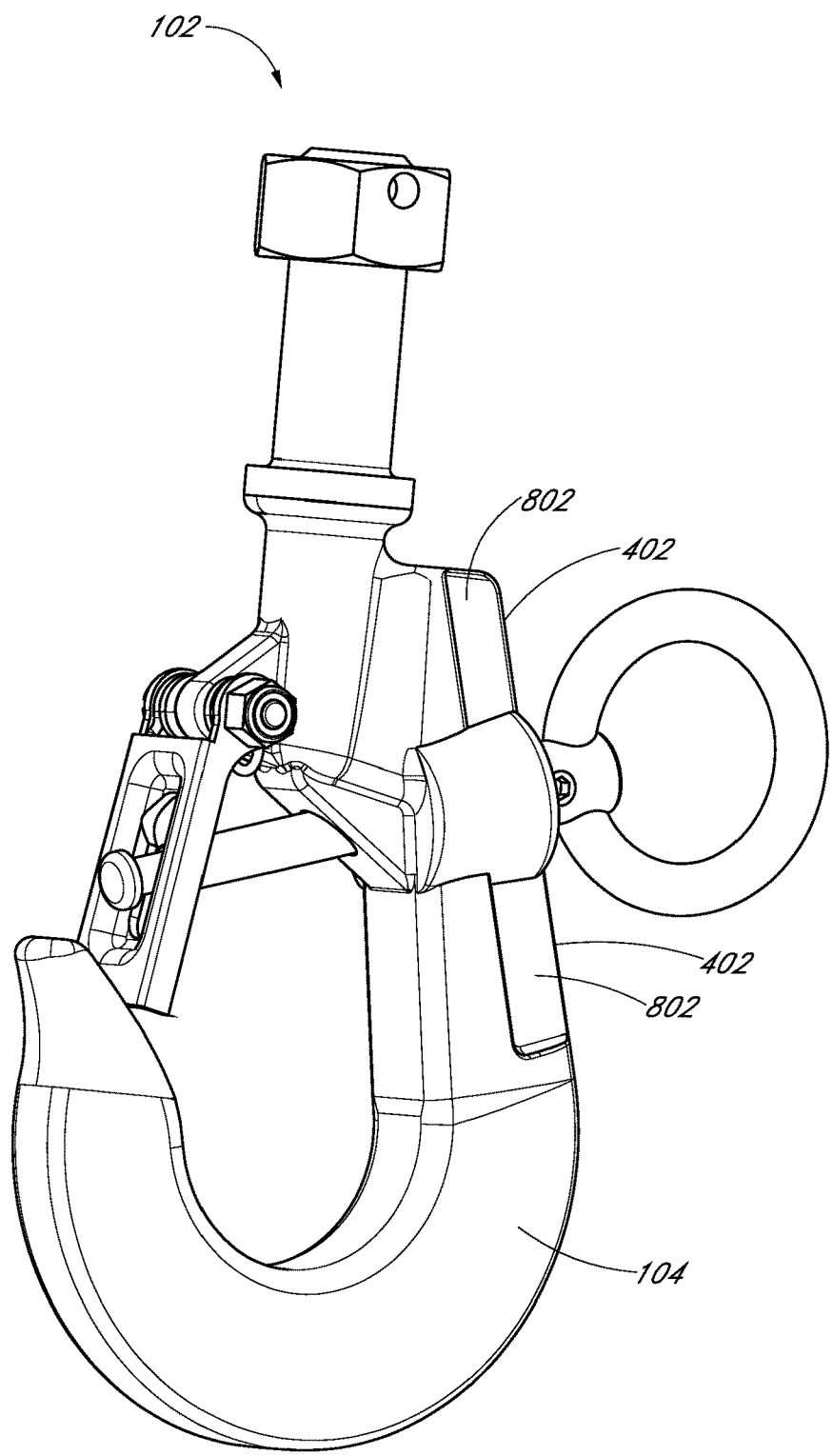
FIG. 10 illustrates a perspective view of an alternative preferred embodiment of a power line hook showing a contour adjacent the attachment surface in accordance with one embodiment.

A presently preferred alternative embodiment of the power line hook 102 is shown in FIG. 10, where a hook shank contour 802 is formed adjacent the hook shank 104 attachment surface 402. The inward contouring results in the width of both attachment surfaces being substantially the same. While a standard hotstick will attach to both attachment surfaces regardless of whether the hook shank contour 802 is provided, optics may suggest including the contour. In an alternative preferred embodiment, the contour extends along only a portion of the attachment surface, preferably the portion below the engagement ring.

As various changes could be made in the above constructions without departing from the scope of the invention, it is intended that all the matter contained in the above description or shown in the accompanying drawings shall be interpreted as illustrative and not in a limiting sense.

What is claimed is:

1. A spring-loaded safety latch release for a power line hook comprising,
   a hook body including a hook shaft extending from a hook base, a hook shank extending in an opposite direction from the hook base, the hook shank extending in a curvilinear manner and terminating in a hook end, the curvilinear hook shank defining a hook opening and the hook end and hook base together defining between them a hook throat that is configured in a manner such that through which a support rigging structure may pass into and out from the hook opening;
   a safety latch pivotally connected to the hook base and movable toward and away from the hook end for opening and closing access to the hook throat, wherein the safety latch is spring-biased toward the hook end in a manner closing access to the hook throat;
   a release pin attached at a first end to the safety latch and at a second end to an engagement ring, wherein the hook body has an aperture formed therein, extending within the hook body in a linear manner from a first opening formed in an outside surface of the hook shank to a second opening formed in an inside surface of the hook base adjacent the hook throat, and wherein the release pin is slidably as well as rotatably received within the aperture, the first end extending outside the opening in the surface of the hook base and the second end extending outside the opening in the surface of the hook shank, and wherein the outside surface of the hook shank adjacent the opening formed for receipt of the release pin forms an attachment surface, and wherein the attachment surface is planar and of a certain width, both configured for receipt of the attachment surface within a groove formed at an end of a standard hotstick; and
   wherein in its assembled operable condition the safety latch and the release pin jointly and cooperatively move upon an application of force to either of them.

2. The spring-loaded safety latch release of claim 1, wherein the release pin has a direction of slidable travel oriented in 90 degree relation to the attachment surface of the hook shank.

3. The spring-loaded safety latch release of claim 2, wherein the engagement ring, attached to the second end of the release pin, when in its assembled operable condition overlies the attachment surface of the hook shank, and its attachment to the release pin, which freely spins within the hook body aperture, enabling the engagement ring to readily spin, adapting the engagement ring for swift and secure connection to a standard hotstick.

4. The spring-loaded safety latch release of claim 2, wherein an outwardly face of the safety latch has a recess formed therein with a linear slot formed within the recess, both the recess and the linear slot extending along a central lateral axis of the safety latch, and further comprising,
   a release pin end cap attached to the first end of the release pin, the end cap received within the recess and an adjoining length of the release pin received within the linear slot.

5. The spring-loaded safety latch release of claim 4, wherein an angled, planar latch-receiving surface is formed on an inside surface of the hook base, the latch-receiving surface positioned and configured in a manner to receive the inwardly face of the safety latch upon its pivoting to a fully open position, and as so positioned, the end cap and the safety latch recess cooperatively configured to minimize end cap protrusion into the open hook throat.

6. A spring-loaded safety latch release for a power line hook comprising,
- a hook body having a curved hook shank defining a hook opening and a hook throat, the hook throat providing access to the hook opening;
- a safety latch pivotally attached to the hook body and having an extended position across the hook mouth blocking access to the hook opening and a retracted position removed from the hook mouth and unblocking access to the hook opening, wherein the safety latch is spring-biased in the extended position, and wherein the hook body has an aperture formed therein and extending entirely through the hook body from a location accessible to the safety latch and extending to a location on the hook body remote therefrom, and wherein the hook body has an attachment surface formed on an outside surface at the location on the hook body remote from the location accessible to the safety latch, and wherein the attachment surface is configured for receipt of the attachment surface within a groove formed at an end of a standard hotstick;
- a release pin slidably received within the hook body aperture, the release pin extending from the location accessible to the safety latch to the location on the hook body remote therefrom, wherein the release pin has a first and a second end, the first end attached to the safety latch; and
- an engagement ring attached to the second end of the release pin at a location remote from the location accessible to the safety latch.

7. The spring-loaded safety latch release of claim 6, wherein the release pin has a direction of slidable travel oriented in 90 degree relation to the attachment surface of the hook body.

8. The spring-loaded safety latch release of claim 6, wherein the release pin is slidably and rotatably received within the hook body aperture and wherein, when in its assembled operable condition, the engagement ring overlies the attachment surface of the hook body and freely spins, adapting the engagement ring for swift and secure connection to a standard hotstick.

9. The spring-loaded safety latch release of claim 6, wherein an outwardly face of the safety latch has a recess formed therein with a linear slot formed within the recess, the recess and the linear slot both extending along a central lateral axis of the safety latch, and further comprising,
- a release pin end cap attached to the first end of the release pin, the end cap received within the recess and an adjoining length of the release pin received within the linear slot.

10. The spring-loaded safety latch release of claim 9, wherein an angled, planar latch-receiving surface is formed on a surface of the hook body adjacent to the retracted position of the safety latch, the latch-receiving surface positioned and configured in a manner to receive an inwardly face of the safety latch upon its pivoting to a fully retracted position, and as so positioned, the end cap and the safety latch recess cooperatively configured to minimize end cap protrusion into the open hook throat.

\* \* \* \* \*